US010584729B2

(12) United States Patent
Barnum

(10) Patent No.: US 10,584,729 B2
(45) Date of Patent: Mar. 10, 2020

(54) MOLD TOOL WITH QUICK CONNECT KNOCKOUT BAR

(71) Applicant: MAGNA MIRRORS OF AMERICA, INC., Holland, MI (US)

(72) Inventor: Randy R. Barnum, Sand Lake, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 959 days.

(21) Appl. No.: 15/083,893

(22) Filed: Mar. 29, 2016

(65) Prior Publication Data

US 2016/0290376 A1 Oct. 6, 2016

Related U.S. Application Data

(60) Provisional application No. 62/142,704, filed on Apr. 3, 2015.

(51) Int. Cl.
*F16B 7/20* (2006.01)
*F16B 7/04* (2006.01)
*B29C 45/40* (2006.01)

(52) U.S. Cl.
CPC .......... *F16B 7/0426* (2013.01); *B29C 45/401* (2013.01)

(58) Field of Classification Search
CPC ...... F16B 7/10; F16B 7/20; F16B 7/22; Y10T 403/7007; Y10T 403/7077; Y10T 403/7088
See application file for complete search history.

(56) References Cited

U.S. PATENT DOCUMENTS

| | | | | |
|---|---|---|---|---|
| 5,513,622 A | * | 5/1996 | Musacchia, Sr. ......... | F16B 7/20 124/86 |
| 5,741,084 A | * | 4/1998 | Del Rio ............. | A61B 17/1633 285/361 |
| 5,868,533 A | * | 2/1999 | Fiala ..................... | B23B 31/113 408/226 |
| 6,357,896 B1 | * | 3/2002 | Yeh ......................... | E04H 12/18 362/410 |
| 6,612,534 B2 | * | 9/2003 | Hennessey ............. | F16M 11/28 248/161 |
| 6,796,529 B1 | * | 9/2004 | Duran ....................... | B64C 1/36 244/129.5 |
| 2005/0163559 A1 | * | 7/2005 | Chang ..................... | F16B 7/042 403/109.3 |
| 2009/0269960 A1 | * | 10/2009 | Holland ............. | H01R 13/6273 439/333 |

(Continued)

*Primary Examiner* — Daniel J Wiley
(74) *Attorney, Agent, or Firm* — Honigman LLP

(57) ABSTRACT

A quick connector is used for releasably connecting a knockout bar and a mold tool. The quick connector includes an inner body that is attached to the knockout bar or the mold tool and is configured to receive a male fitting of the other of the knockout bar or the mold tool. The quick connector also has an outer sleeve movable along the inner body between (i) a locking position, where the outer sleeve causes locking elements of the quick connector to engage the male fitting to lock the male fitting in the inner body, and (ii) an unlocking position, where the locking elements do not engage the male fitting and do not lock the male fitting in the inner body. The quick connector includes a retaining element that functions to retain the outer sleeve in the unlocking position.

20 Claims, 6 Drawing Sheets

(56) References Cited

U.S. PATENT DOCUMENTS

2011/0113558 A1* 5/2011 Olszewski ........... A61G 13/101
                                                       5/658
2016/0186792 A1* 6/2016 Valencia ............... F16B 7/0406
                                                     403/349

* cited by examiner

US 10,584,729 B2

MOLD TOOL WITH QUICK CONNECT KNOCKOUT BAR

CROSS REFERENCE TO RELATED APPLICATION

The present application claims the filing benefits of U.S. provisional application Ser. No. 62/142,704, filed Apr. 3, 2015, which is hereby incorporated herein by reference in its entirety

FIELD OF THE INVENTION

The present invention relates generally to a releasable connection, and more specifically to a quick connector for releasably connecting two elements together.

BACKGROUND OF THE INVENTION

It is known to have knockout bars threaded into both the platen and tool. Such threaded connections (such as shown in FIGS. 1 and 2) require manual tie in and removal of the knockout bars during changeover.

SUMMARY OF THE INVENTION

The present invention provides a quick connector for releasably connecting two elements together. For example, the quick connector may releasably connect a knockout bar to a mold tool to enhance the time and ease of changeover. The quick connector of the present invention includes a retaining element that retains the quick connector in its unlocking or releasing state to further enhance changeover.

According to one embodiment of the present invention, a quick connector for releasably connecting to an element includes an inner body and an outer sleeve movable along the inner body. The inner body is configured to receive a male fitting of the element. The outer sleeve is movable between a locking position and an unlocking position. In the locking position, the outer sleeve causes locking elements of the quick connector to engage the male fitting, and thus, to lock the male fitting in the inner body. In the unlocking position, the locking elements do not engage the male fitting to lock the male fitting in the inner body. The quick connector also includes a retaining element that functions to retain the outer sleeve in the unlocking position.

According to another embodiment of the present invention, a quick connector is provided for releasably connecting a knockout bar to a mold tool. The quick connector includes an inner body coupled with either the knockout bar or the mold tool. The inner body has a cavity and a locking element that is movable radially inward within the cavity to engage a male fitting on the other of the knockout bar and the mold tool. An outer sleeve surrounds the inner body and is axially movable relative to the inner body between a locking position and an unlocking position. In the locking position, the locking element moves radially inward to engage the male fitting. In the unlocking position, the locking element is withdrawn radially outward to disengage from the male fitting. The quick connector also includes a retaining element that retains the outer sleeve in the unlocking position.

According to yet another embodiment of the present invention, a method is for releasably connecting a knockout bar to a mold tool provides a quick connector having an inner body coupled with either the knockout bar or the mold tool. The inner body of the quick connector is configured to receive a male fitting of the other of the knockout bar and the mold tool. The method includes a step of moving an outer sleeve along the inner body from a locking position, where the outer sleeve causes a locking element of the quick connector to engage the male fitting to lock the male fitting in the inner body, to an unlocking position, where the locking element does not engage the male fitting to lock the male fitting in the inner body. The method also includes retaining the outer sleeve in the unlocking position with a retaining element of the quick connector.

These and other objects, advantages, purposes and features of the present invention will become apparent upon review of the following specification in conjunction with the drawings.

DESCRIPTION OF THE PREFERRED EMBODIMENTS

Figure 1:
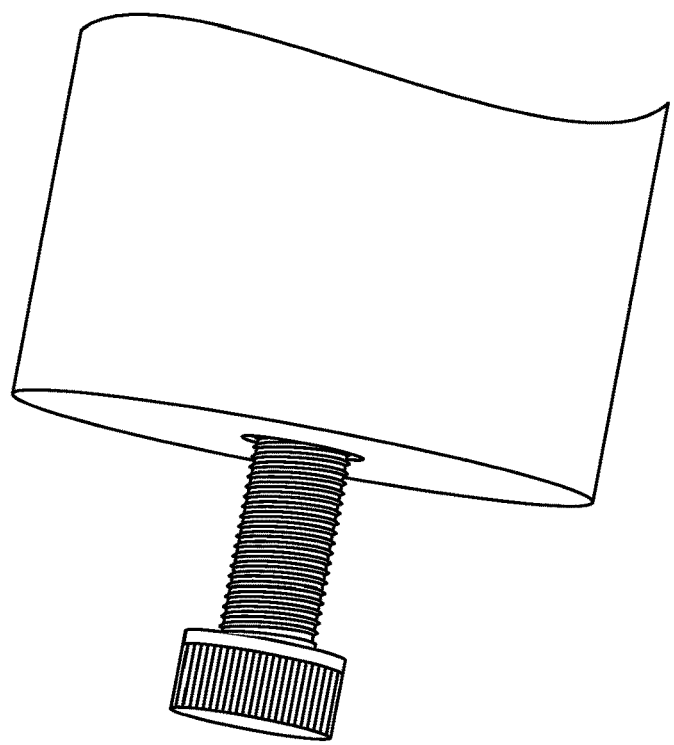
FIGS. 1 and 2 are perspective views of conventional threaded connectors for connecting to knockout bars.
Figure 2:
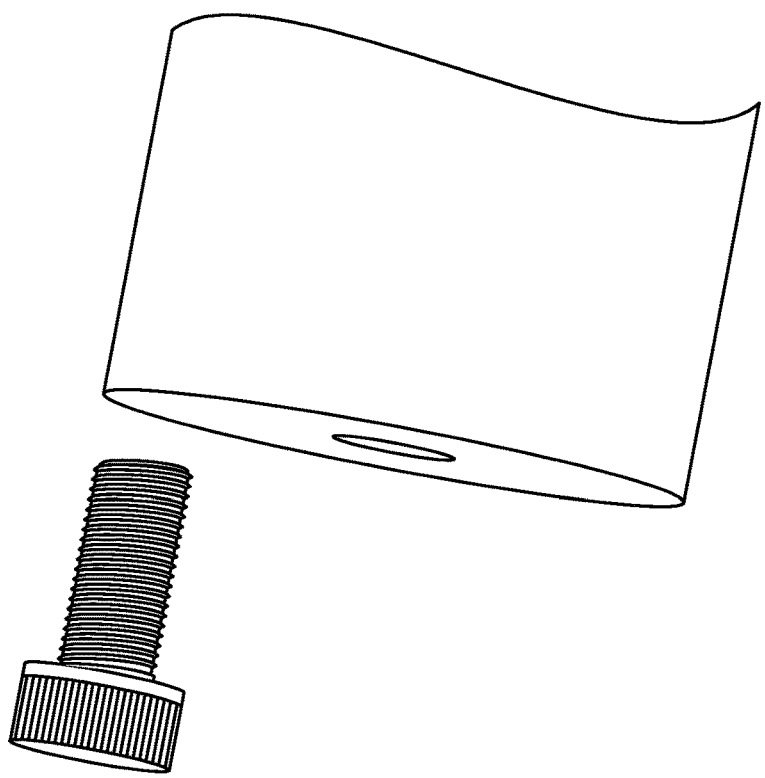
Figure 3:
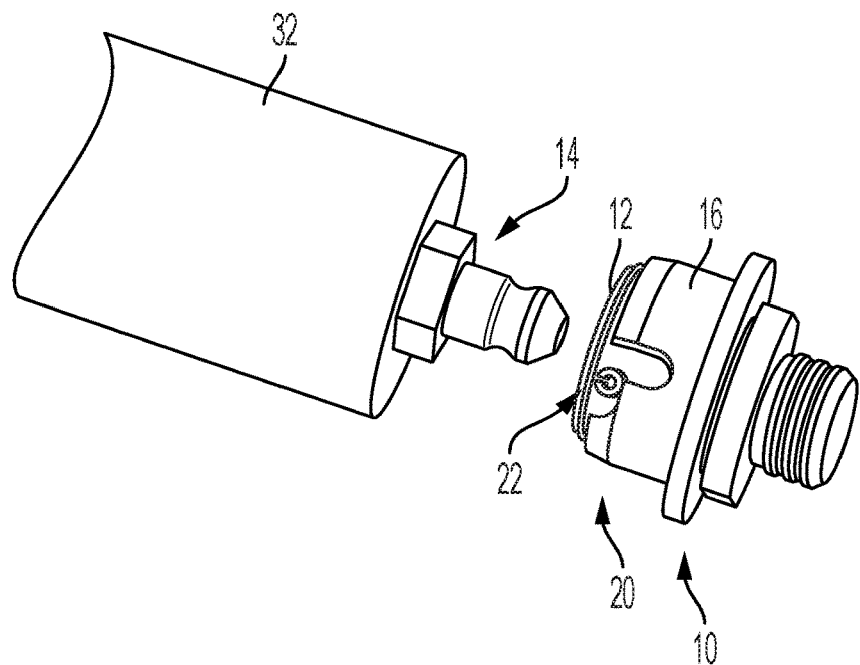
FIGS. 3 and 4 are perspective views of a quick connector that connects to a fitting at an end of a knockout bar and that is retainable in a disconnect state in accordance with the present invention.
Figure 4:
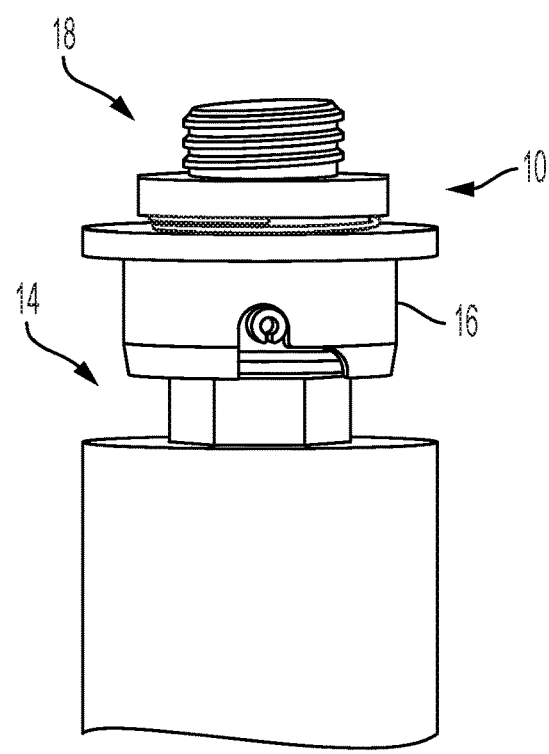
Figure 5:
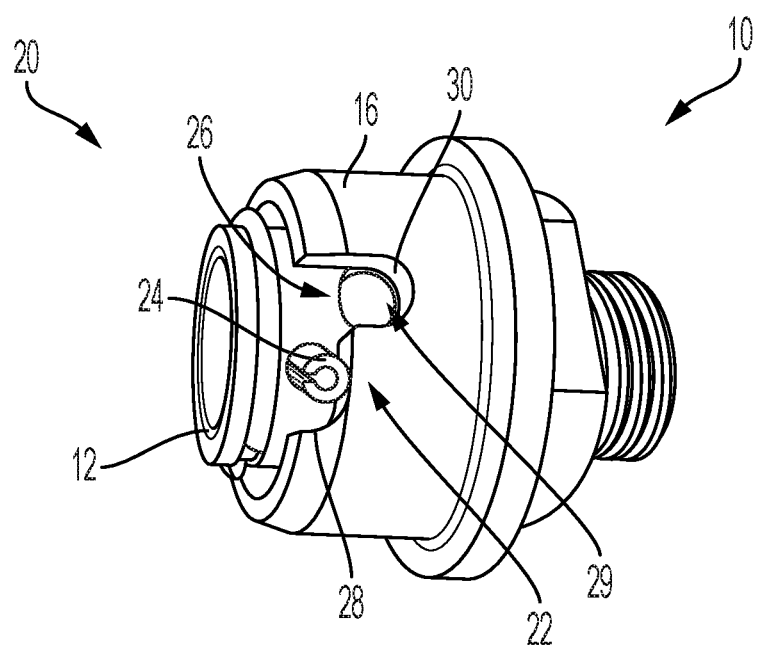
FIG. 5 is an enlarged perspective view of the quick connector of the present invention.

Referring now to the drawings and the illustrative embodiments depicted therein, a quick connect connector 10 comprises an inner connector portion or inner body 12 that is configured to receive a male fitting 14 and an outer connector portion or sleeve 16 that is movable relative to the inner body 12 to adjust the connector between a locking or connecting state 18 and an unlocking or disconnecting state 20 (FIGS. 3-5). The quick connect connector 10 includes a plurality of locking elements or balls (such as three or four or more locking elements spaced equidistantly apart around the connector) that, when the outer sleeve 16 is moved to its unlocking state 20, can move radially outward to allow for the male fitting 14 to be received in the inner body 12, and when the outer sleeve is moved to its locking state 18, move radially inward to engage and retain or lock the male fitting 14 in the connector 10. The quick connector includes a retaining element 22 that functions to retain the quick connector in its unlocking state 20 to ease disconnection of the connector from the male fitting 14, as discussed below.

As best shown in FIG. 5, the inner connector portion 12 includes a pin 24 extending or protruding radially outwardly therefrom and the outer sleeve 16 includes a notch or slotted cutout region 26 that allows for selective degree of movement of the outer sleeve 16 along the inner connector portion 12 depending on where the pin 24 is along the notch or slotted cutout region 26. For example, when the pin is at the shallower portion 28 of the notch (such as shown in FIG. 5), the outer sleeve 16 is precluded from moving axially along the inner connector portion 12 towards its locked state 18 and the connector is thus retained in its unlocked state. In the unlocked state, the locking element 29 is also provided with space at the deeper portion 30 of the notch to move radially outward relative to the cavity of the inner body 12. However, such space for radial movement of the locking element may be provided by the shape of the inner surface of the outer sleeve, which may have a larger inner diameter nearer to its end so that when pulled back relative to the inner body 12 (as shown in FIG. 5), the locking elements of the inner body are located at the larger inner diameter region of the outer sleeve and can thus move radially outward to disconnect from the male fitting to allow for removal of the connector from the male fitting. Likewise, when the outer sleeve 12 is rotated to align the pin 24 with the deeper portion 30 of the notch (such as shown in FIG. 4), the outer sleeve 16 may move further along the inner connector 12 to its locked state 18 to lock the connector at the male fitting (due to the smaller inner diameter region of the inner body moving over the locking elements to urge them radially inward to engage the notch or groove of the male fitting).

Thus, when the outer sleeve moves along the inner body to the locking state, the locking elements (such as three or four or more equidistantly spaced apart elements or balls disposed at respective apertures of the inner body) are urged radially inward to engage respective regions of the groove of the male fitting so as to limit retraction of the male fitting from the connector. When so retained at the male fitting, the male fitting cannot be retracted from the connector, but the connector may be rotatable about the male fitting (with the locking elements or balls moving along the groove of the male fitting as the connector is rotated relative to the male fitting).

In the illustrated embodiment, the inner body 12 of the quick connector 10 is substantially cylindrically-shaped and the outer sleeve 16 surrounds a circumference of the inner body 12, such that sliding movement of the outer sleeve 16 relative to the inner body 12 is generally along the central axis of the inner body 12 and rotational movement of the outer sleeve 16 relative to the inner body 12 is generally around the central axis of the inner body 16. The notch or slot 26 is shown having the deeper portion 30 extending along the outer sleeve 16 in substantial alignment with the axis of the inner body 12 and the shallow portion 28 extending generally perpendicularly to the deeper portion 30, to allow the pin 24 to rest thereon when the outer sleeve 16 is biased toward the locking position 18. Optionally, the inner body and outer sleeve may be alternatively shaped and configured to move relative to each other (for example, the shallower portion 28 of the notch may have a recess that receives the pin 24 therein to limit rotation of the outer sleeve relative to the pin and inner body so as to retain the outer sleeve in its unlocked position). Optionally, the quick connector may have the pin 24 and the slot 26 interchanged, alternatively shaped, or replaced with a different type of releasable connection, such as a swinging hook-type lock or other attachment feature configured to retain the outer sleeve in the unlocking position.

Figure 8:
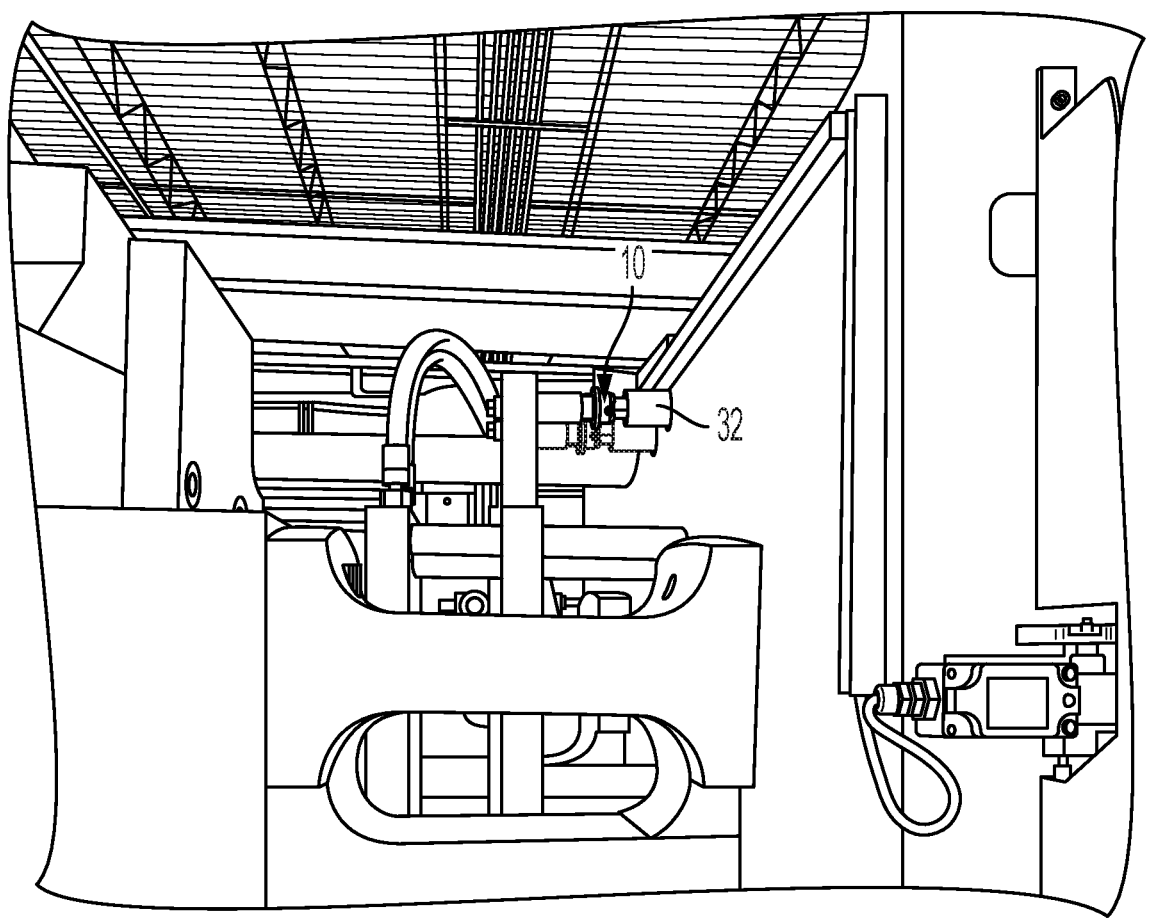
FIG. 8 is a perspective view of a mold system having the quick connector at an end of a spacer in accordance with the present invention.
Figure 9:
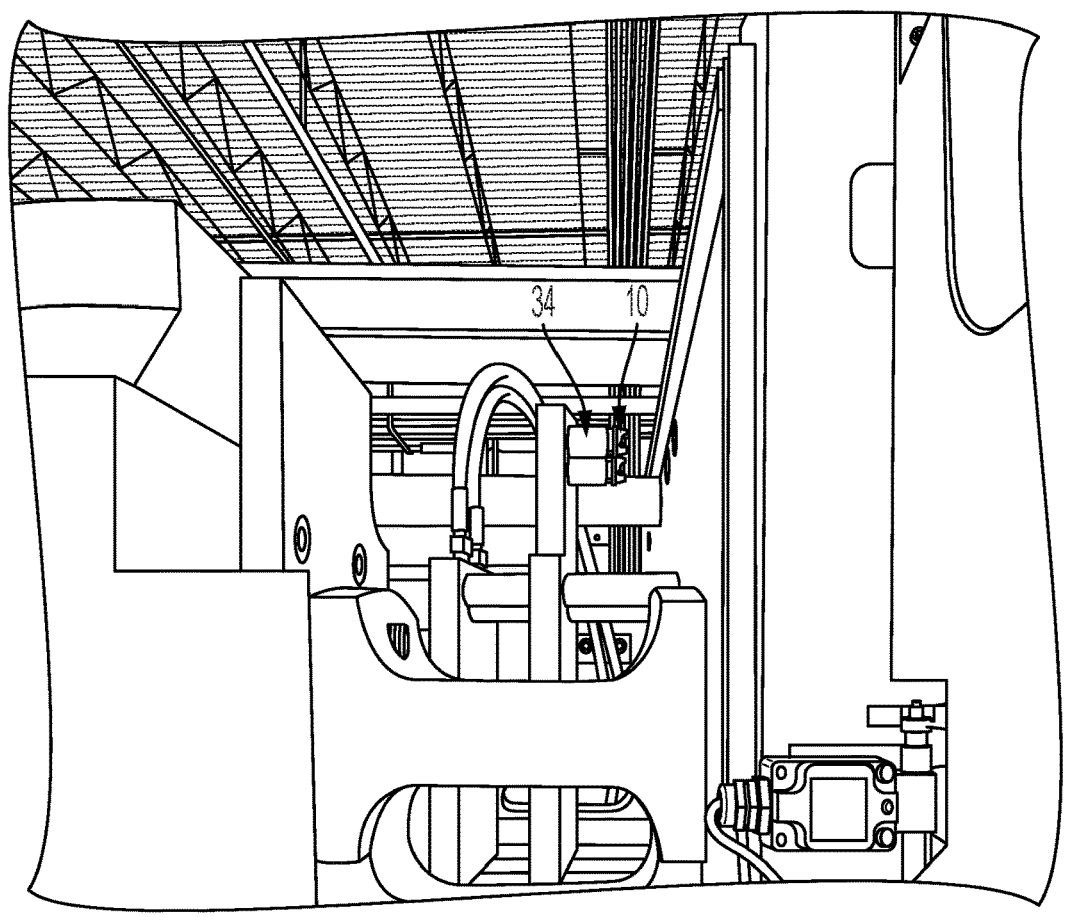
FIGS. 9 and 10 are perspective views of the mold system of FIG. 8, shown with the quick connector disconnected from the knockout bar.
Figure 10:
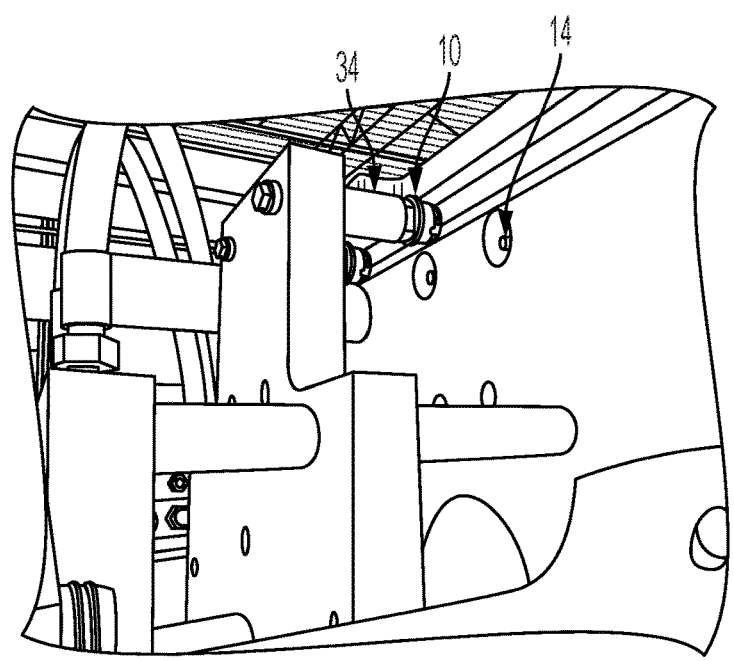
Figure 11:
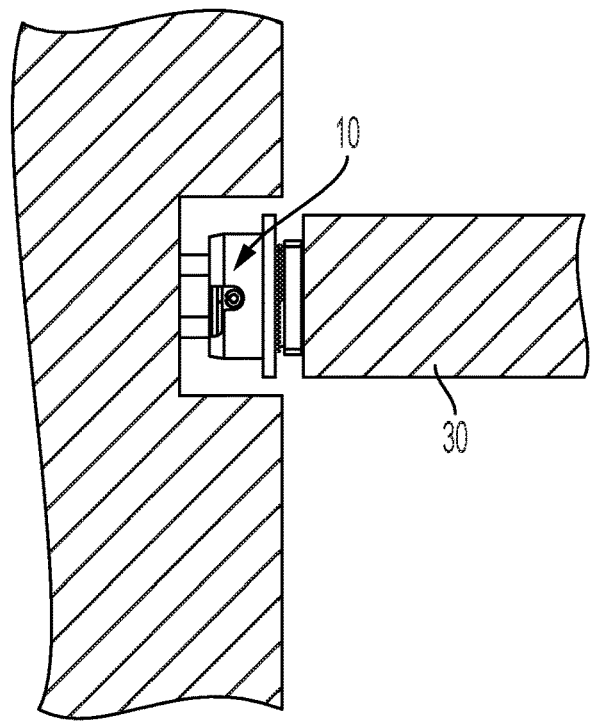
FIGS. 11 and 12 are cross-sectional views of the quick connector attached between a knockout bar and a press with a spacer shown in FIG. 12.
Figure 12:
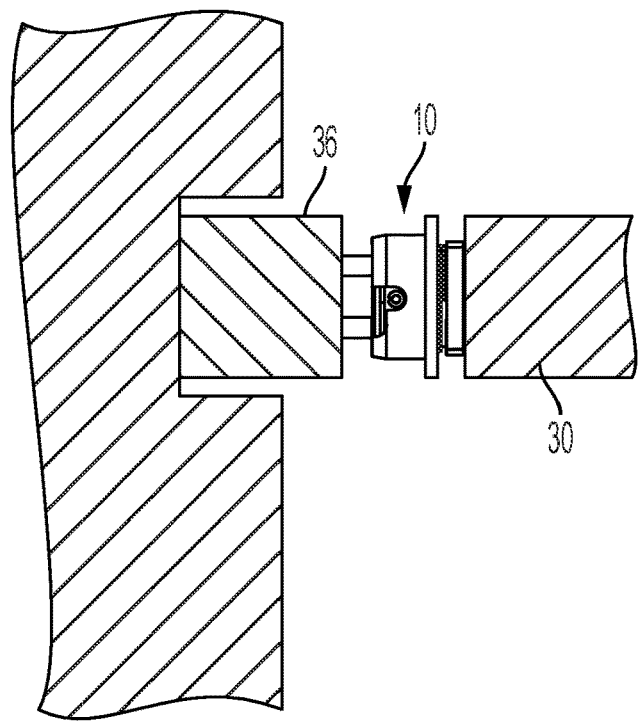

As shown in FIGS. 8-10, the quick connector 10 may be connected between a knockout bar 32 and a platen 34 of the mold tool. In FIGS. 9 and 10, the connector 10 is attached to the platen 34 of the mold tool, and disengaged from the male fitting 14 of the knockout bar 32 (FIG. 8). Optionally, a threaded end of the connector may be threaded onto a spacer 36 (FIG. 12) or extension body that has an axial length that extends from a pocket or counter bore outside of a mold, and the quick connect end may connect to or receive a male fitting threaded into the end of the knockout bar (such as shown in FIG. 3). The present invention thus provides tool-free quick clamping or connecting between the platen end and tool end. The average reduction in change over time is about eight minutes.

Figure 6:
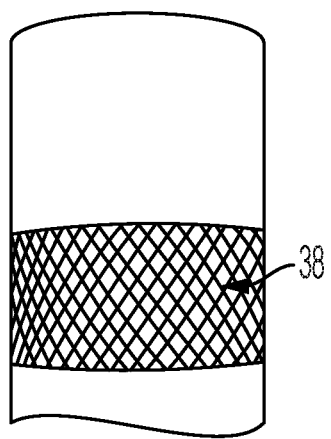
FIG. 6 is a perspective view of a non-slip surface suitable for use at an outer surface of the connector sleeve of the connector of the present invention.
Figure 7:
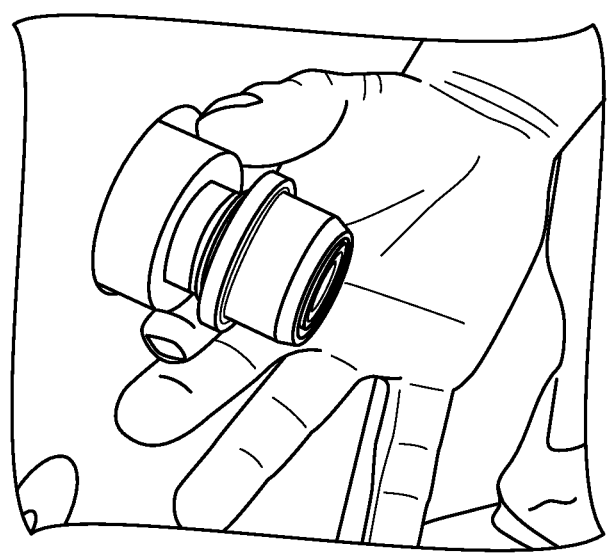
FIG. 7 is a perspective view showing the quick connector at an end of a spacer to allow for tool free unlocking at the platen side of the system in accordance with the present invention.

The present invention provides a quick connect having collar modification to the female end of the connector, which allows for tool-free unlocking of the knockout bar at the platen side of the system. Optionally, and such as shown in FIG. 6, an anti-slip surface or feature 38 may be provided at the collar's outer surface to allow ease of rotating collar relative to the connector body to disconnect or unlock the connector. Optionally, a spacer 36 or extension body may be used to position the connector for tool-free unlocking at the platen side of the system. The quick connector may also be elongated or otherwise integrally formed with a spacer with to eliminate the need for a separate spacer 36. The spacer 36 may also be provided on the press side to function as an adapter, allowing the coupler to have a different thread size, such as a universal size, and having customized spacers formed to screw into the press or accept a bolt to thread into it, depending on the style of the press. For example, each press may include different patterns of holes in which the knock out bars are used, such that a modified coupler should be installed for each hole, allowing them to be locked and unlocked whenever there is a different tool put in the press.

Thus, the present invention provides improved change-over times on injection mold presses (such as for various plastic components for vehicles, including, for example, plastic molded mirror casings for interior and exterior mirror assemblies and the like) by developing a quick disconnect system for changing knockout bars. The system of the present invention eliminates the need to manually untie knockout bars at the press side by facilitating retaining the connector in its unlocked state to improve the capability of the quick connect system. Through use of threaded spacers the system of the present invention eliminates the need to remove the connectors at the press side when tool changes require knockout bar patterns to move. The system thus provides the connector collar allowing tool-free rotation to unlock the quick connect. The connector collar may have an anti-slip surface (such as a knurled or non-smooth surface), thus allowing easy rotation of the collar between its locked and unlocked positions or states.

Optionally, aspects of the quick connect of the present invention may be applicable to any male/female quick connection, such as trailer hitches or the like. The quick connector of the present invention may be configured to have an outer sleeve that is movable along an inner receiving portion or connecting portion (that is configured to attach to a fitting or the like), with the outer sleeve being lockable or retainable relative to the inner connecting portion so as to retain the quick connector in an unlocking state. Such a connector is an improvement over known quick connectors, which often have an outer sleeve that is spring-loaded or biased towards the locking state, such that, once released by the user, snap into the locking state and thus cannot be readily held in an unlocking state. The quick connector of the present invention provides a retaining element or elements at the inner body and outer sleeve that facilitates retention of the outer sleeve in a retracted or unlocked state. The outer sleeve of the quick connector of the present invention may be spring-loaded or biased relative to the inner body and towards its locking state, such that, when the outer sleeve is rotated to align the pin with the deeper slot or notch in the sleeve, the outer sleeve is biased or urged axially towards its locking state so as to move along the inner body to lock the connector onto a fitting received in the inner body of the connector.

Changes and modifications in the specifically described embodiments may be carried out without departing from the principles of the present invention, which is intended to be limited only by the scope of the appended claims as interpreted according to the principles of patent law.

The invention claimed is:

1. A quick connector for releasably connecting a knockout bar to a mold tool, said quick connector comprising:
    an inner body coupled with one of the knockout bar and the mold tool, said inner body configured to receive a male fitting of the other of the knockout bar and the mold tool;
    a radially movable locking element movably disposed at a periphery of said inner body;
    an outer sleeve comprising a slotted guide, said outer sleeve being axially and rotatably movable along said inner body between
        (i) a locking position, where said outer sleeve causes said locking element to engage the male fitting to lock the male fitting in said inner body, and
        (ii) an unlocking position, where said locking element does not engage the male fitting and does not lock the male fitting in said inner body; and
    a retaining element protruding from said inner body and configured to engage said slotted guide on said outer sleeve, wherein said retaining element functions to retain said outer sleeve in said unlocking position.

2. The quick connector of claim 1, wherein said outer sleeve is biased towards said locking position.

3. The quick connector of claim 2, wherein said retaining element retains said outer sleeve in said unlocking position with a biasing force that urges said outer sleeve towards said locking position.

4. The quick connector of claim 1, wherein, when said outer sleeve is in said unlocking position, said retaining element engages said slotted guide to limit movement of said outer sleeve towards said locking position so as to retain said outer sleeve in said unlocking position.

5. The quick connector of claim 4, wherein said slotted guide includes a first portion that retains said retaining element with said outer sleeve in said unlocking position and a second portion that allows said outer sleeve to move to said locking position.

6. The quick connector of claim 5, wherein said outer sleeve rotates relative to said inner body to move said retaining element between said first and second portions of said slotted guide.

7. The quick connector of claim 5, wherein said outer sleeve is biased in an axial direction, such that said first portion of said slotted guide is orthogonal to the axial direction to prevent axial movement of said retaining element relative to said outer sleeve.

8. The quick connector of claim 1, wherein said outer sleeve includes an anti-slip feature disposed an outer surface of said outer sleeve, said anti-slip feature oriented for moving said outer sleeve between said locking and unlocking positions.

9. The quick connector of claim 1, comprising a bearing disposed between said inner body and said outer sleeve to permit low friction axial and rotational movement therebetween.

10. The quick connector of claim 1, wherein said outer sleeve surrounds said inner body and is axially and rotatably movable relative to said inner body, wherein said outer sleeve rotates between said locking and unlocking positions.

11. The quick connector of claim 1, wherein said locking element is movable radially inward within a cavity of said inner body, and wherein the mold tool is part of an injection molding press configured to mold a plastic part and the knockout bar is configured to remove the plastic part from the injection molding press.

12. A method for releasably connecting a knockout bar to a mold tool, the method comprising:
    providing a quick connector having: (i) an inner body coupled with one of the knockout bar and the mold tool, said inner body configured to receive a male fitting of the other of the knockout bar and the mold tool; (ii) a radially movable locking element movably disposed at a periphery of said inner body; (iii) an outer sleeve comprising a slotted guide, and (iv) a retaining element protruding outward from said inner body;
    moving said outer sleeve along said inner body from a locking position, where said outer sleeve causes said locking element of said quick connector to engage the male fitting to lock the male fitting in said inner body, to an unlocking position, where said locking element does not engage the male fitting and does not lock the male fitting in said inner body; and
    retaining said outer sleeve in said unlocking position by engaging said retaining element in said slotted guide.

13. The method of claim 12, further comprising rotating said outer sleeve relative to said inner body to retain said outer sleeve in said locking position with said retaining element.

14. The method of claim 12, wherein said retaining element engages said slotted guide to limit movement of said outer sleeve towards said locking position so as to retain said outer sleeve in said unlocking position.

15. The method of claim 12, wherein said slotted guide includes a first portion that retains said retaining element with said outer sleeve in said unlocking position and a second portion that permits movement of said retaining element to move said outer sleeve out of said locking position.

16. A quick connector for releasably connecting a knockout bar to a mold tool, said quick connector comprising:
    an inner body coupled with one of the knockout bar and the mold tool, said inner body having a cavity and a locking element that is movable radially inward within the cavity to engage a male fitting on the other of the knockout bar and the mold tool;
    an outer sleeve comprising a slotted guide, said outer sleeve surrounding said inner body and being axially movable relative to said inner body between
        (i) a locking position, where said locking element moves radially inward to engage the male fitting, and
        (ii) an unlocking position, where said locking element is withdrawn radially outward to disengage from the male fitting; and
    a retaining element that protrudes outward from said inner body, engages said slotted guide, and retains said outer sleeve in said unlocking position.

17. The quick connector of claim 16, wherein said retaining element comprises a pin protruding radially outward from said inner body, said pin movably engaged in a slot of said outer sleeve, wherein said slot includes a holding portion configured to retain said pin with said outer sleeve in said unlocking position.

18. The quick connector of claim 16, wherein said outer sleeve is biased toward said locking position, such that said retaining element retains said outer sleeve in said unlocking position against the biasing force, and wherein said outer sleeve is rotatable relative to said inner body for moving said outer sleeve between said locking and unlocking positions.

19. The quick connector of claim 16, further comprising an extension body disposed between said inner body and said knockout bar, said extension body having an axial length configured to extend outside of a mold for exposing said outer sleeve.

20. The quick connector of claim 16, wherein said outer sleeve rotates and moves axially relative to said inner body to move said outer sleeve into engagement with said retaining element for holding said outer sleeve in said unlocking position.

* * * * *